(12) United States Patent
Stepp et al.

(10) Patent No.: US 11,238,470 B2
(45) Date of Patent: Feb. 1, 2022

(54) SYSTEM OF STRUCTURED ARGUMENTATION FOR ASYNCHRONOUS COLLABORATION AND MACHINE-BASED ARBITRATION

(71) Applicant: HRL Laboratories, LLC, Malibu, CA (US)

(72) Inventors: Nigel D. Stepp, Santa Monica, CA (US); David J. Huber, Calabasas, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 87 days.

(21) Appl. No.: 16/724,130

(22) Filed: Dec. 20, 2019

(65) Prior Publication Data

US 2020/0286108 A1   Sep. 10, 2020

Related U.S. Application Data (60) Provisional application No. 62/815,631, filed on Mar. 8, 2019.

(51) Int. Cl.
  *G06Q 30/02* (2012.01)
  *G06Q 10/04* (2012.01)
  *G06F 17/16* (2006.01)

(52) U.S. Cl.
  CPC ......... *G06Q 30/0203* (2013.01); *G06F 17/16* (2013.01); *G06Q 10/04* (2013.01); *G06Q 30/0204* (2013.01)

(58) Field of Classification Search
  None
  See application file for complete search history.

(56) References Cited

U.S. PATENT DOCUMENTS

| | | | |
|---|---|---|---|
| 10,268,660 B1* | 4/2019 | Arazi | A63F 13/50 |
| 10,467,327 B1* | 11/2019 | Arazi | G06Q 50/01 |
| 2006/0212339 A1* | 9/2006 | Hubbard | G06Q 10/04 |
| | | | 705/35 |

(Continued)

OTHER PUBLICATIONS

Chang, Welton et al., Accountability and adaptive performance under uncertainty: A long-term view, Judgment and Decision Making, vol. 12, No. 6, Nov. 2017, pp. 610-626 (2 parts).

Chang, Welton et al., Restructuring structured analytic techniques in intelligence, ResearchGate, https://www.researchgate.net/publication/321006524, Published Nov. 11, 2017, 22 pages (2 parts).

Search Report issued in PCT/US2019/068175 dated Feb. 25, 2020, 11 pages.

(Continued)

*Primary Examiner* — Stephanie Z Delich
(74) *Attorney, Agent, or Firm* — Lewis Roca Rothgerber Christie, LLP (57) ABSTRACT

A method for collecting and processing user input. In some embodiments the method includes presenting a first user with a prompt for eliciting a first response, the first response including a numerical portion including one or more numbers, and an explanatory portion; receiving, from the first user, the first response; receiving from each of a plurality of other users, a respective response of a plurality of other responses; and displaying, to the first user, an ordered list of other responses. Within the ordered list, a second response, of the plurality of other responses, may be earlier than a third response, of the plurality of other responses, the second response being, according to a measure of distance, more distant, than the third response, from the first response.

22 Claims, 8 Drawing Sheets

(56) References Cited

U.S. PATENT DOCUMENTS

| | | | | |
|---|---|---|---|---|
| 2007/0067211 | A1* | 3/2007 | Kaplan | G06Q 10/10 705/7.31 |
| 2007/0078977 | A1* | 4/2007 | Kaplan | G06Q 10/04 709/224 |
| 2008/0209416 | A1* | 8/2008 | De Souza | G06Q 10/06 718/100 |
| 2010/0004976 | A1* | 1/2010 | Faure | G06Q 10/04 705/7.31 |
| 2010/0063864 | A1* | 3/2010 | Lewis | G06Q 30/06 705/7.32 |
| 2014/0075004 | A1* | 3/2014 | Van Dusen | G06F 16/90335 709/223 |
| 2015/0339415 | A1* | 11/2015 | Klein | G06F 30/20 703/6 |
| 2019/0180395 | A1* | 6/2019 | Moretti | G06Q 50/182 |

OTHER PUBLICATIONS

Satopää, Ville A et al., Modeling Probability Forecasts via Information Diversity, arXiv:1406.2148v5 [stat.ME] Sep. 10, 2015, 32 pages (2 parts).

Chaudoin, Stephen et al., Revolutionizing Teaching and Research with a Structured Debate Platform, Published Aug. 2017, 13 pages.

Rostami, Mohammad et al. A Crowdsourcing Triage Algorithm for Geopolitical Event Forecasting, ReeSys '18, Oct. 2-7, 2018, Vancouver, BC, Canada, pp. 377-381.

U.S. Appl. No. 16/591,397 entitled a System and Method of Structuring Rationales for Collaborative Forecasting, filed Oct. 2, 2019.

U.S. Appl. No. 16/522,529 entitled A Multitask-Learning Triage, Recommender, and Assignment System for Crowdsourced Forecasting of Geopolitical Events, filed Jul. 25, 2019.

* cited by examiner

Forecasts lower than yours

[1] [2] [3] ... [11]

Search...

Crude Oil Production in Libya is expected to be 869.54 BBL/D/1K by the end of this quarter, according to Trading Economics global macro models and analysts expectations. Looking forward, we estimate Crude Oil Production in Libya to stand at 848.50 in 12 months time. In the long-term, the Libya Crude Oil Production is projected to trend around 848.20 BBL/D/1K in 2020, according to our econometric models. https://tradingeconomics.com/Libya/crude-oil-production/forecast

Forecasts higher than yours

[1] [2] [3] ... [80]    410

Search...  Popularity 4.4

NO   Is this a good rationale?   YES

Given the focus of this question is a valuable commodity during wartime you must give careful consideration to each countries state of affairs. Right now most countries are likely upping defense and prepping. For some this could include stopping production to safely move and stockpile valuables. This particular type of product is very volatile at the moment and could honestly go either way. However, given the past history it is safe to assume that production will most likely be on the lower side around 900-1050. But there is a slight chance they wont be that conservative and go a little higher.

SYSTEM OF STRUCTURED ARGUMENTATION FOR ASYNCHRONOUS COLLABORATION AND MACHINE-BASED ARBITRATION

CROSS-REFERENCE TO RELATED APPLICATION(S)

The present application claims priority to and the benefit of U.S. Provisional Application No. 62/815,631, filed Mar. 8, 2019, entitled "SYSTEM OF STRUCTURED ARGUMENTATION FOR ASYNCHRONOUS COLLABORATION AND MACHINE-BASED ARBITRATION", the entire content of which is incorporated herein by reference.

The present application is related to U.S. patent application Ser. No. 16/591,397 ("the '397 Application") filed Oct. 2, 2019, the entire content of which is incorporated herein by reference.

GOVERNMENT LICENSE RIGHTS

This invention was made with U.S. Government support under contract No. 2017-17061500006 awarded by the Intelligence Advanced Research Projects Activity (IARPA) Hybrid Forecasting Competition (HFC). The U.S. Government has certain rights in this invention.

FIELD

One or more aspects of embodiments according to the present disclosure relate to forecast aggregation and arbitration.

BACKGROUND

Related art on-line message boards are on occasion used, by users of such message boards, to solicit advice or opinions that may be helpful to such users. For example, a user who may want to buy or sell a certain commodity may solicit opinions regarding the likely future price of the commodity. The user may then analyze and aggregate the received responses in an ad-hoc manner, endeavoring to assess the expertise of those who posted responses, and to distill from the responses a forecast of the future price.

Such an approach may have various shortcomings. On a message board, a user may start a discussion in a "thread" and other users may comment on the original post or the posts that others make in response to the original post. This type of discussion may lack any type of discernable structure, though sometimes the responses to posts are displayed as a tree for contextual understanding. Regardless of how the structure is handled, such interfaces may do little to guide the discussion, which may be left entirely to the participants. Consequently, discussions may become derailed due to drifting off-topic, failures to cite sources to back up a given opinion, or the citing of sources that do not support the argument being made.

Another potential shortcoming relates to the participants themselves. The users may be victims of their biases and their initial arguments and opinions. For example, users may be influenced by a type of bias called "anchoring", in which a user may be strongly influenced by the first external opinion she or he sees or hears. Another potential bias is called "confirmation bias", a type of logical failure in which a person creates an opinion and then validates it by only selecting sources and other methods of validation that agree with it, ignoring any opinions or resources that might dissent.

Further, it may be difficult or impossible for participants to arrive at any type of consensus, even when building consensus and arriving at a conclusion is the primary objective of the discussion.

Thus, there is a need for a system and method for facilitating productive interactions between on-line users.

SUMMARY

According to an embodiment of the present invention, there is provided a method for collecting and processing user input, the method including: presenting, by a processing circuit, a first user with a prompt for eliciting a first response, the first response including: a numerical portion including one or more numbers, and an explanatory portion; receiving, by the processing circuit, from the first user, the first response; receiving, by the processing circuit, from each of a plurality of other users, a respective response of a plurality of other responses; displaying, by the processing circuit, to the first user, an ordered list of other responses; determining, by the processing circuit, whether the first user and the other users have reached a consensus; in response to determining that the first user and the other users have formed a consensus forecast, producing, by the processing circuit, the consensus forecast; in response to determining that the first user and the other users have not formed a consensus forecast, producing, by the processing circuit, a mediated forecast; and causing, by the processing circuit, an action to be taken, in response to the consensus forecast or in response to the mediated forecast, wherein: a second response, of the plurality of other responses, is earlier in the ordered list than a third response, of the plurality of other responses, and the second response is, according to a measure of distance, more distant than the third response from the first response.

In some embodiments, the method further includes denying the first user access to all of the other responses until the first response is received from the first user.

In some embodiments, the prompt for eliciting the first response includes a prompt for eliciting the numerical portion and prompt for eliciting the explanatory portion, the prompt for eliciting the numerical portion including a prompt for eliciting a forecast; and the prompt for eliciting the explanatory portion including a prompt for eliciting a rationale for the forecast.

In some embodiments, the prompt for eliciting the explanatory portion further includes a prompt for eliciting citations supporting the rationale.

In some embodiments, the method further includes presenting the first user with a prompt for eliciting a rating of the second response.

In some embodiments, the method further includes: displaying the first response to a second user, of the plurality of other users, and eliciting, from the second user, a rating of the first response.

In some embodiments, the method further includes presenting, to the second user, a prompt for eliciting a rating of a citation in the first response.

In some embodiments, the prompt for eliciting the rating of the citation in the first response includes: a prompt for eliciting an assessment of relevance of the citation; and a prompt for eliciting an assessment of veracity of the citation.

In some embodiments, the method further includes, after displaying, to the first user, the ordered list of other responses, presenting the first user with a prompt for eliciting an adjustment to the first response.

In some embodiments: the numerical portion represents an ordinal forecast, and is represented by a vector of numbers; and the measure of distance is, for a first vector and a second vector, a ratio of: a difference between: an answer density of the first vector and an answer density of the second vector; and a measure of similarity between the first vector and the second vector.

In some embodiments, the answer density of each of the first vector and the second vector is a weighted sum over elements of the vector, with each weight being an index of the respective element.

In some embodiments, the measure of similarity is a ratio of: a dot product of the vectors, and a product of magnitudes of the vectors.

In some embodiments: the numerical portion represents a categorical forecast, and is represented by a vector of numbers, the measure of distance, from a reference vector, of a test vector, is a ratio of: a difference between: a value of a maximum element of the reference vector and a value of an element of the test vector corresponding to the maximum element of the reference vector; and a measure of similarity between the vectors.

In some embodiments, the measure of similarity is a ratio of: a dot product of the vectors, and a product of magnitudes of the vectors.

In some embodiments: the numerical portion represents a categorical forecast, and is represented by a vector of numbers, the measure of distance, from a reference vector, of a test vector, is a product of: a sign term, and a preliminary measure of distance, from the reference vector, of the test vector.

In some embodiments, the preliminary measure of distance, from the reference vector, of the test vector, is an absolute value of a ratio of: a difference between: a value of a maximum element of the reference vector and a value of an element of the test vector corresponding to the maximum element of the reference vector; and a ratio of: a dot product of the vectors, and a product of magnitudes of the vectors.

In some embodiments, the sign term is: one, when the value of the element of the test vector corresponding to the maximum element of the reference vector is a maximum element of the test vector, and negative one, otherwise.

In some embodiments, the method further includes assigning, by a processing circuit, a rating to the first response and to each of the other responses.

In some embodiments, the method further includes displaying to the first user a position of the numerical portion within a range of numerical portions of other responses.

According to an embodiment of the present invention, there is provided a system for collecting and processing user input, the system including: a processing circuit, and a memory coupled to the processing circuit and having instructions stored thereon that, when executed by the processing circuit, cause the processing circuit to: present a first user with a prompt for eliciting a first response, the first response including: a numerical portion including one or more numbers, and an explanatory portion; receive, from the first user, the first response; receive, from each of a plurality of other users, a respective response of a plurality of other responses; and display, to the first user, an ordered list of other responses determine whether the first user and the other users have reached a consensus; in response to determining that the first user and the other users have formed a consensus forecast, produce the consensus forecast; in response to determining that the first user and the other users have not formed a consensus forecast, produce a mediated forecast; and cause an action to be taken, in response to the consensus forecast or in response to the mediated forecast, wherein: a second response, of the plurality of other responses, is earlier in the ordered list than a third response, of the plurality of other responses, and the second response is, according to a measure of distance, more distant than the third response from the first response.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system of structured argumentation for asynchronous collaboration and machine-based arbitration provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
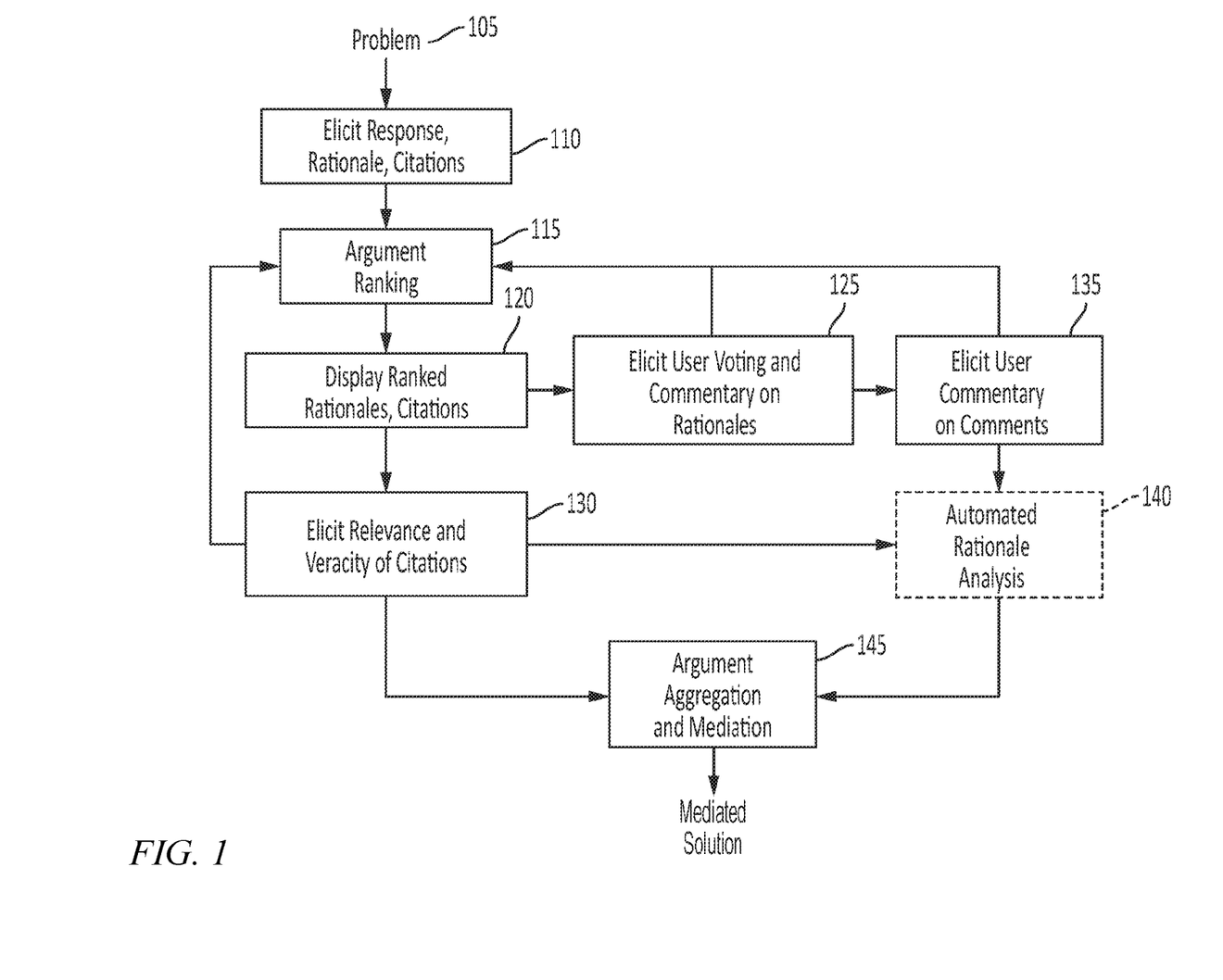
FIG. 1 is a system block diagram, according to an embodiment of the present disclosure.
Figure 2:
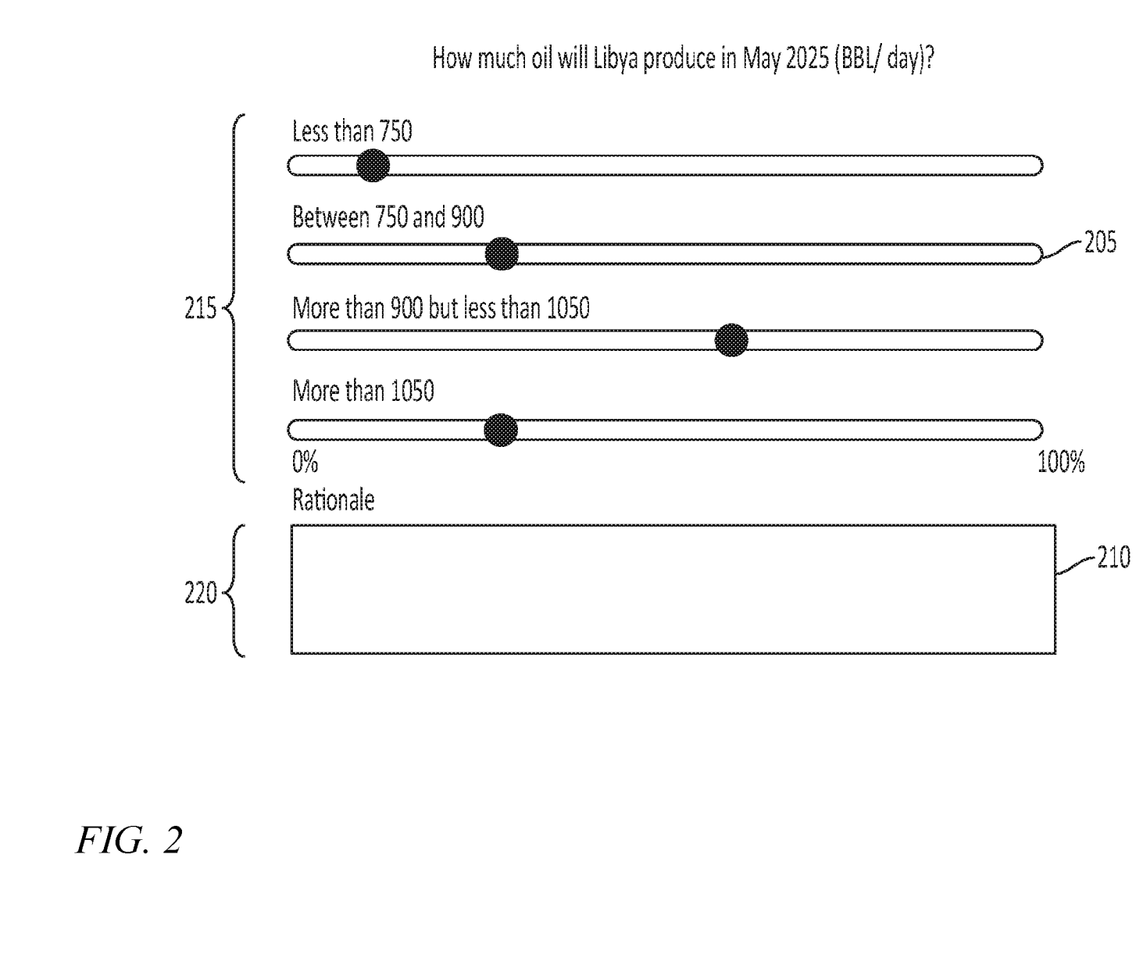
FIG. 2 is a prompt, according to an embodiment of the present disclosure.

FIG. 1 shows a system diagram, of a system for argumentation, in some embodiments. The system for argumentation may be configured by a user, referred to herein as the "host", who wishes to obtain a spectrum of opinions (or "forecasts"), or a consensus opinion, from a plurality of users. The host may wish to survey other users for their opinions regarding a problem 105; as an illustrative example, the problem 105 may be estimating (or forecasting) the amount of oil Libya will produce in May 2020. The host may configure the system according to the question to be answered, and each participating user may then be presented, at 110, with a prompt eliciting a response to the question. FIG. 2 shows an example of a prompt eliciting a response. The user is presented with a plurality of sliders 205, and a text box 210. The sliders elicit a numerical portion 215 of the response (the user's forecast of the likely oil output, as discussed in further detail below), and the text box elicits an explanatory portion 220 of the response (the user's rationale for the forecast).

Each of the plurality of sliders 205 corresponds to a range, or "answer bin" (the first range being values less than 750, the second range being values between 750 and 900, and so forth). The user may adjust each slider to reflect the user's confidence that the answer is in the range corresponding to the slider. For example, if a user is certain that the amount will be more than 900 barrels (BBL) and less than 1050 barrels, the user may slide the third slider all the way to the right (indicating 100% confidence that the answer is in this range). If, in the user's view, the amount is certain to be more than 750 barrels and less than 1050 barrels, and equally likely to either (i) fall short of 900 barrels or (ii) exceed 900 barrels, the user may slide each of the second and third sliders half-way to the right, i.e., to 50%.

The software (e.g., JavaScript running in a browser through which the user interacts with the system for argumentation) may automatically adjust the sliders so that the total of the four values indicated is 100%. The algorithm may preferentially adjust sliders the user has not yet adjusted, to avoid having a slider setting change affect a previously made setting of another slider, contrary to the user's wishes. For example, in some embodiments, if the user were to adjust the first slider to 50% and then attempt to adjust the second slider beyond 50% (resulting in a total >100%), the system would simply "snap" the value of the second slider to the highest allowable value for the second slider such that their sums total 100%. In some embodiments, once the first slider is set, the system will not change it without explicit user intervention, which may involve the user's changing the slider manually, or the user's clicking a button that normalizes all of the sliders to have equal values (50% for 2 sliders, 25% for 4, etc.).

In the text box 210, the user may provide a rationale for the forecast. The rationale may include explanatory text that the user enters. Further, because argumentation may be unproductive unless participants can cite relevant and truthful sources to support their forecasts, the system may provide a method for users to cite sources that support their arguments, either by inserting URLs into their rationale, providing a URL separately in a "citation upload" field, or by uploading a document in a web-ready format such as Portable Document Format (pdf). These citations may then be shown to other participants as internet links or downloadable document files that they may examine and include in their own arguments, for example by arguing specific points of the citation or by providing their own counter-citations. Other users may also evaluate the citations (as discussed in further detail below).

The user may be presented with the prompt of FIG. 2 without previously, or simultaneously, having access to any forecasts other users may have made (i.e., the user may be denied such access until a response, to the prompt, is received from the user); this feature (of denying the user access to the forecasts of others) may eliminate anchoring, and mitigate, e.g., reduce, confirmation bias. Confirmation bias may also be mitigated by selection of the order in which other users' responses are later displayed (as discussed in further detail below).

The prompt of FIG. 2 elicits a type of forecast that may be referred to as an "ordinal forecast". As used herein, "ordinal forecasts" are those in which there is an ordering to the possible answer bins, as is the case with the bins (each corresponding to a respective slider) in FIG. 2. A forecast in which there is no such ordering may be referred to as a "categorical forecast". An example of a categorical forecast is a prediction of which of, e.g., four candidates, will win an election. In such a case, the prompt may be similar to that of FIG. 2, with the first slider being labeled with the name of the first candidate, (instead of being labeled "Less than 750" as in FIG. 2), the second slider being labeled with the name of the second candidate, and so forth. In such a forecast, the user may also use the sliders to indicate degree of confidence, e.g., adjusting the second slider all the way to the right if the user is certain that the second candidate will win. Whether the forecasts are ordinal or categorical may affect how a "distance" between the forecasts of two users (a measure of the extent to which two users disagree) may be calculated (as discussed in further detail below). Ordinal forecasts and categorical forecasts may each be represented by a vector (e.g., a vector having one element for each range or answer bin, or, in the case of a categorical forecast, item (e.g., candidate)), each element of the vector representing the degree of a user's confidence that the corresponding range or item is the correct answer to the question posed by the host.

It will be understood that any other interface suitable for receiving numerical input from a user (e.g., a set of text boxes, each for receiving a respective number) may be used instead of sliders, that the number of input fields or controls may differ from the four shown in FIG. 2, and that the feature of constraining, or automatically adjusting, the controls to have a certain total (e.g., 100%) may be absent (in such a case the system may normalize the vector of numerical input values before further processing if appropriate). Referring again to FIG. 1, after responses have been elicited (at 110) from a plurality of users, the forecasts may be ranked (at 115) and displayed (at 120) to each user after the user has provided an initial response (e.g., by responding to the prompt of FIG. 2).

Figure 3:
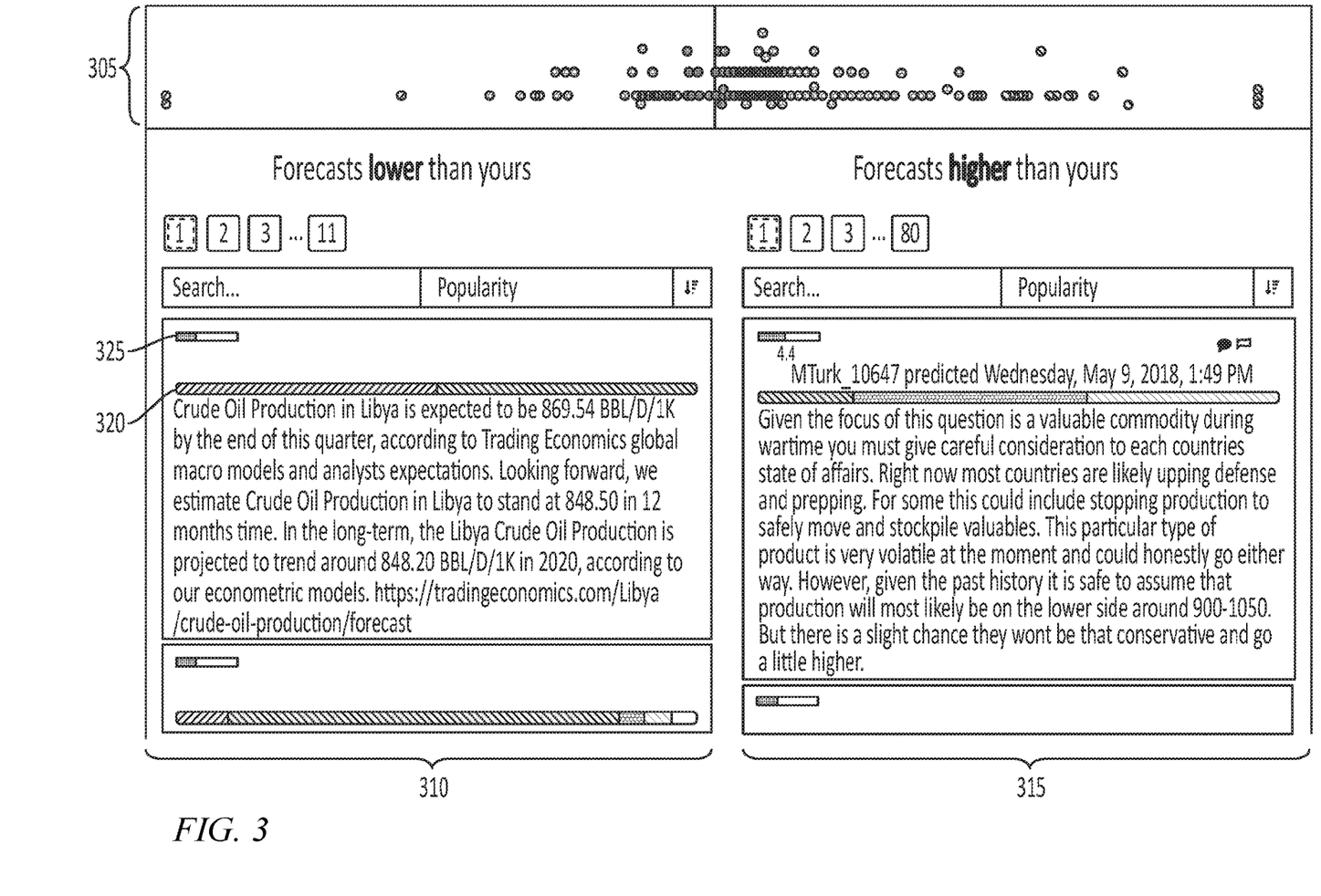
FIG. 3 is a prompt, according to an embodiment of the present disclosure.

The other forecasts displayed to any user may be sorted (or "ordered" or "ranked") (at 115, FIG. 1), with the first-displayed (or "earliest") responses being forecasts that disagree most strongly with the user's forecast (i.e., that are most distant from the user's forecast). This may cause the user to review and confront conflicting opinions; in this manner, the system for argumentation may mitigate confirmation bias and drive the population users toward self-evaluation and constructive debate. FIG. 3 shows an example of how the forecasts may be displayed to a particular user (or the "present user"). A summary graph 305 may show a dot for each of a plurality of other users' forecasts, with the horizontal position of each dot showing the distance of the other user's forecast from the present user's forecast, and the vertical position of each dot showing the rating (by other users, discussed in further detail below) of each other user's forecast. A vertical line may show the horizontal position corresponding to the present user's forecast. The "distance" may be a signed quantity, as discussed in further detail below.

Below the summary graph 305, the display may show two lists of other users' forecasts, with (as mentioned above) the forecasts differing most from that of the present user being listed first, i.e., at the top of each list. The left-hand-side list 310 in FIG. 3 shows forecasts having a negative distance from the forecast of the present user (with the other forecast having the greatest (negative) distance from the forecast of the present user being shown first) and the right-hand-side list 315 list on the right in FIG. 3 shows forecasts having a positive distance from the forecast of the present user (with the other forecast having the greatest (positive) distance from the forecast of the present user being shown first). Because some users may be accustomed to being able to change the order of a displayed list from the default order, the system may give each user the options of searching, and of re-sorting each list.

The answer bins of each other user's forecast may be shown as a color bar 320 at the top of each forecast (with each color in the bar corresponding to one of the answer bins, and the length of the segment having that color corresponding to the confidence value for that answer bin). A rating bar 325 may show the number of "up" votes the forecast received. In some embodiments, the prompt of FIG. 2 remains displayed when the prompt of FIG. 3 is shown (the prompt of FIG. 2 may for example be shown directly above the prompt of FIG. 3), or when the prompt of FIG. 4 (discussed below) is shown. This may make it possible for the present user to adjust her or his response to the host's question, having been influenced, for example, by some of the other users' rationales.

Figure 4:
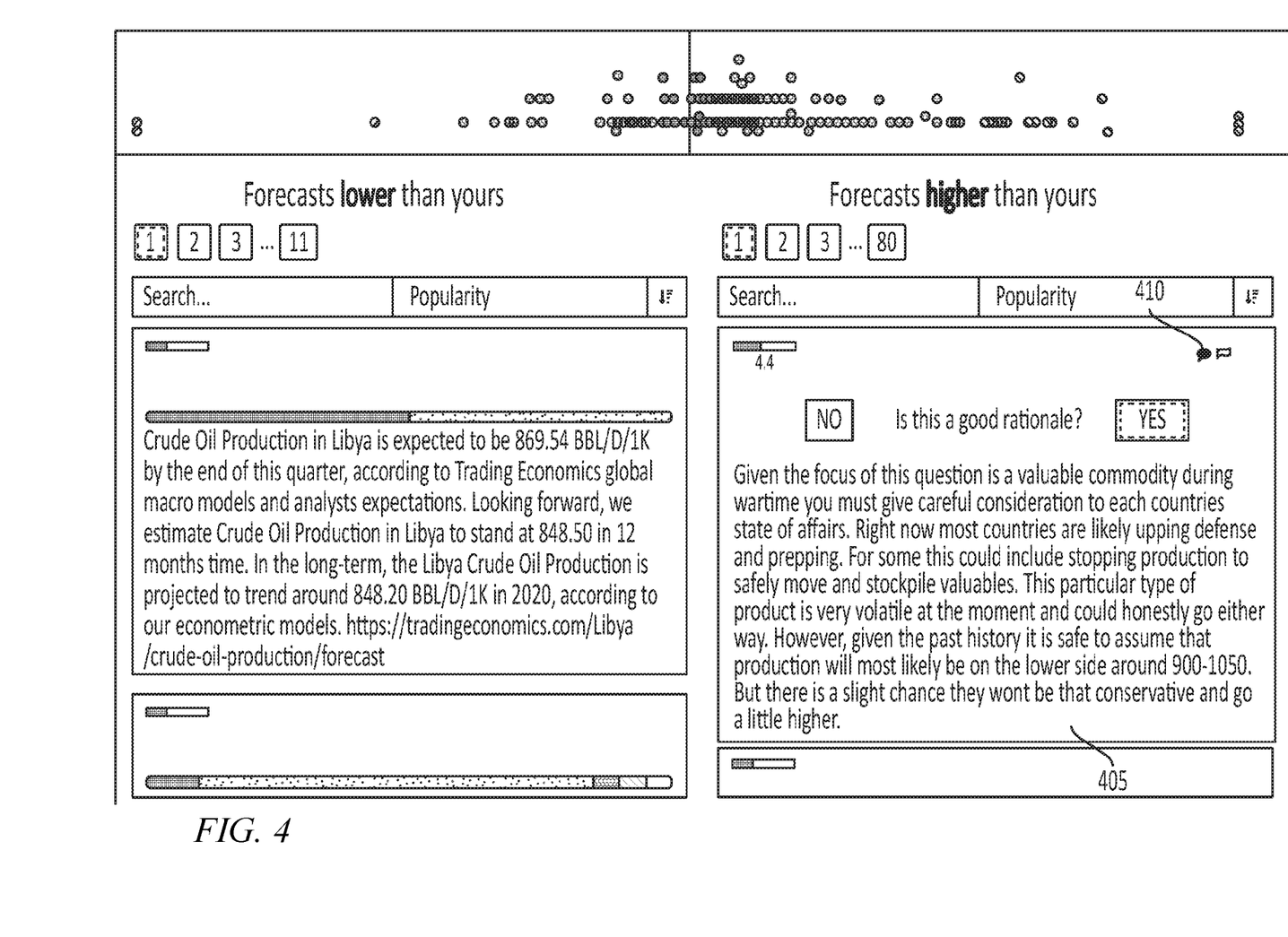
FIG. 4 is a prompt, according to an embodiment of the present disclosure.

The system for argumentation may elicit (at 125, FIG. 1), from each user, assessments of the rationales provided by other users. When the present user hovers over (e.g., places the mouse pointer over) any other user's forecast, the present user may be presented with an opinion rating prompt, an example of which is shown in FIG. 4. The opinion rating prompt 405 may give the user an opportunity to vote "up" by answering "yes" to the question "Is this a good rationale" or to vote "down" by answering "no". Moreover, in the embodiment of FIG. 4, the small speech bubble icon 410 is a button that may open up an edit field for adding a comment on the rationale. The actual text editing field may look like a box, within the boundary of the opinion rating prompt 405 and beneath the text of the opinion rating prompt 405. The addition of a text commentary may be in addition to the Yes/No answer to the "Is this is good rationale?" question. Allowing users to provide a holistic evaluation of a given argument provides a metric that may be used for ranking and aggregating the rationales, in addition to providing visible, low-effort feedback that may encourage participants to engage with the system more often.

To help track the value of the citations that users provide, the system for argumentation may elicit (at 130, FIG. 1), from each user, assessments of citations provided by other users. It may be advantageous for each citation to be evaluated on at least the metrics of relevance and veracity, since these are orthogonal pieces of information for a given citation; one reflects the relationship between the source (e.g., the cited document or publication) and the argument, and the other reflects the value of the source itself. For example, a given source may be accurate and trustworthy, but the user relying on the citation may have misinterpreted its meaning, resulting in its being incorrectly used to support a statement that does not follow from the information in the cited source. Conversely, a participant may cite a source that supports an argument completely, but the cited source may be widely understood to be untrustworthy or highly-biased; in this case, too, the utility of the citation in the argument may be low. Sources that receive multiple down-votes in veracity, particularly from subject matter experts, may be removed from discussion completely. By eliciting feedback for both relevance and veracity, the system allows individual arguments to be weighed and judged, and promotes productive discussion by encouraging the use of outside sources instead of purely opinion-based argumentation.

The system for argumentation may also elicit (at 135, FIG. 1) user commentary on comments. The depth of the discussion tree may be limited, however, to such commentary (e.g., the system may not make it possible for users to provide comments on comments on comments on rationales), to reduce the risk of discussions moving off-topic.

Figure 5A:
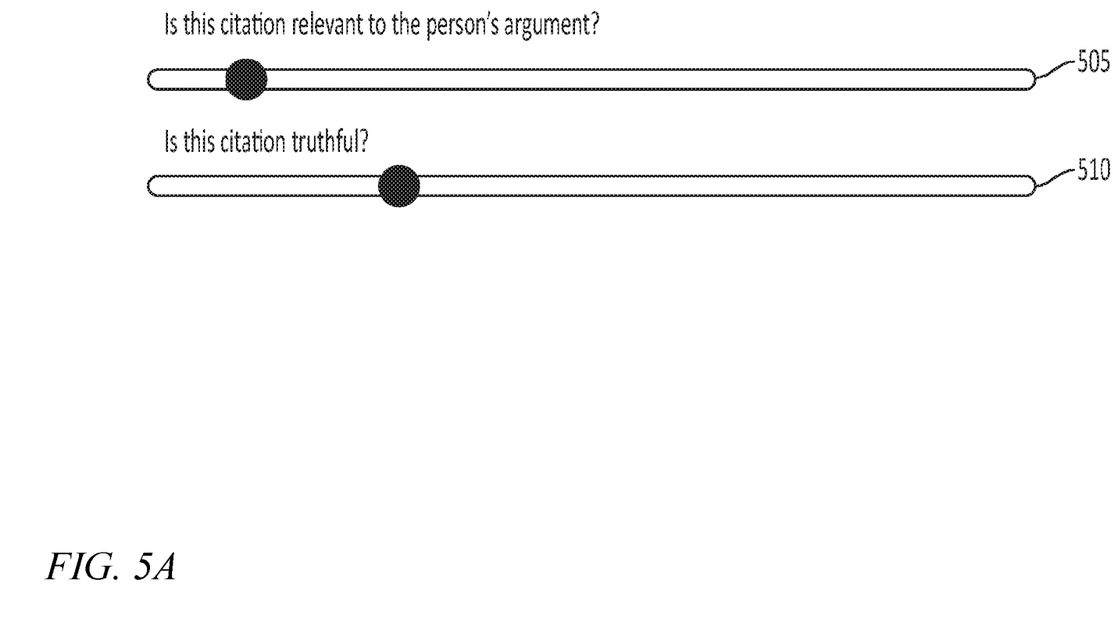
FIG. 5A is a prompt, according to an embodiment of the present disclosure.
Figure 5B:
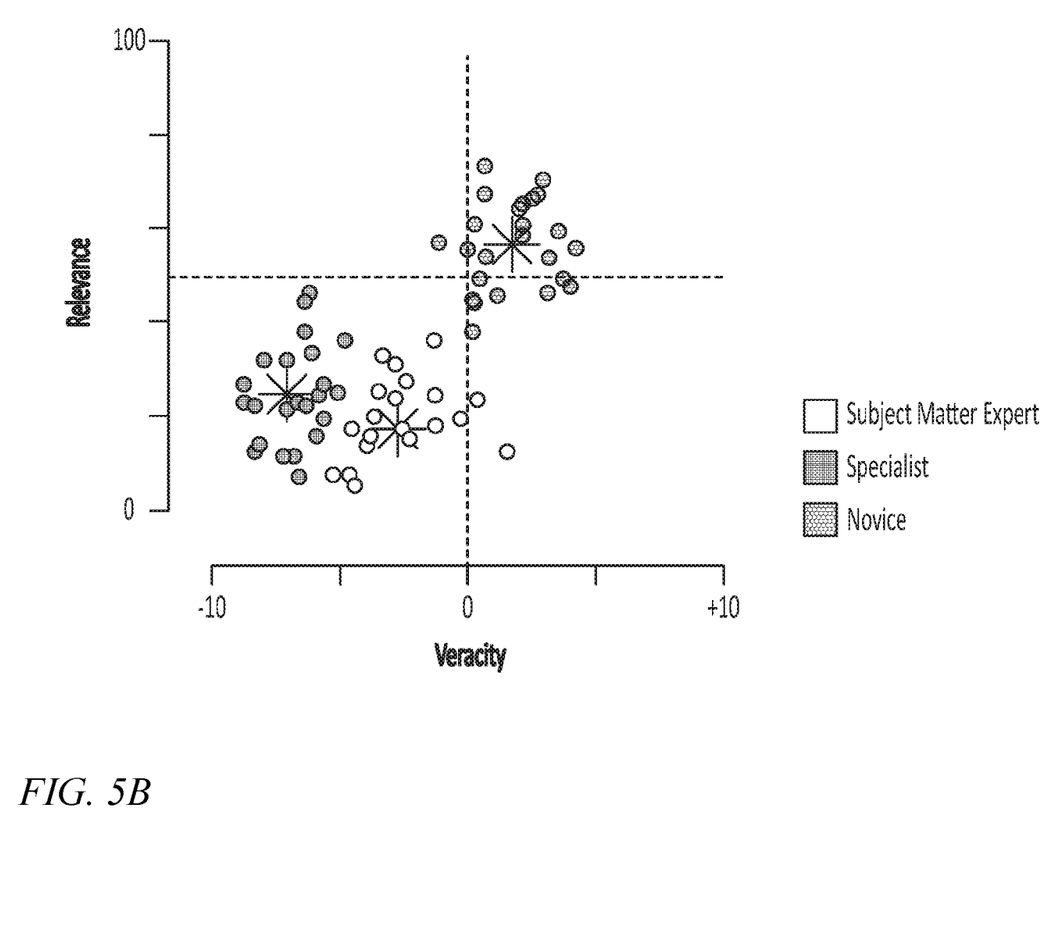
FIG. 5B is a scatter plot, according to an embodiment of the present disclosure

When the present user hovers over any citation in another user's forecast, the present user may be presented with a prompt for eliciting a citation rating, an example of which is shown in FIG. 5A. The prompt of FIG. 5A includes a relevance slider 505 with which the present user may indicate the relevance of the citation, and a veracity slider 510, with which the present user may indicate the truthfulness of the citation. The aggregated two-dimensional citation evaluations may then be displayed (e.g., to the present user, or to the host) in a scatter plot such as that of FIG. 5B. Each citation has a respective set of evaluations and a respective scatter plot such as that of FIG. 5B. In some embodiments, users are classified by various features (e.g., by degree of expertise, as shown in FIG. 5B, or according to one or more other characteristics, such as whether the user is a teammate of the person supplying the citation). The classification may be indicated in the scatter plot by displaying each dot in a corresponding color, for example.

Distances between forecasts may be defined and calculated as follows. For ordinal forecasts, a forecast may be represented as a probability mass function p over N answer bins, such that each answer $p_i \in [0,1]$ and $\Sigma_i^N p_i = 1$. The answer density of a forecast may be a weighted sum of probabilities with the weights being based on the answer bins, e.g., each weight may be the midpoint of a respective bin, or the index of the bin. For example, the answer density may be defined as $$\rho(p) := \Sigma_{i=1}^N i p_i.$$

The similarity between two forecasts p and q is taken to be their correlation, $$r(p, q) := \frac{(p, q)}{\|p\|\|q\|},$$

and the forecast distance is then defined as $$D_{ord}(p, q) := \frac{\rho(q) - \rho(p)}{r(p, q)}.$$

If p is the forecast of a particular user, this metric is positive for forecasts that are weighted higher (i.e., that have a higher answer density) than p and negative for forecasts weighted lower (i.e., that have a lower answer density) than p, scaled by similarity in both cases. This allows a meaningful partition of the set of forecasts into $F^+ = \{q | D_{ord}(p,q) \geq 0\}$ and $F^- = \{q | D_{ord}(p,q) < 0\}$.

For categorical forecasts, the distance may be defined in either of two ways. The first definition, which may be referred to as "agreement on maximum answer value", is concerned with the degree to which two forecasts agree on the top choice of one of the forecasts. That is, if User 1 assigns the greatest value to Candidate B, then all other forecasts are compared by their Candidate B values. The second option, which may be referred to as "agreement on maximum bin index", is concerned first with whether or not two forecasts choose the same bin as their maximum. Details for these two definitions are provided below. In each case, p is a "reference" forecast that is being compared with "test" forecast q.

To calculate a distance according to agreement on maximum answer value, the system may first select the bin that contains the maximum of the reference forecast, $$m = \mathrm{argmax}\{p\}$$

Then, the system may compute distance on that bin, scaled by forecast similarity:

$$D_{cat_a}(p, q) := \frac{q_m - p_m}{r(p, q)}$$

where the forecast similarity $r(p,q)$ is defined the same was as in the case of ordinal forecasts.

This metric is positive if forecast q assigns a greater value to bin m, which is interpreted as more extreme agreement with forecast p. The metric is negative if forecast q assigns a lesser value to bin m, which is interpreted as less extreme agreement with forecast p.

To calculate a distance according to agreement on maximum bin index, the system may select the maximum bin index for each forecast:

$$m = \mathrm{argmax}\{p\}$$

$$n = \mathrm{argmax}\{q\}$$

If these indices are equal, the metric may be selected to be positive, and, otherwise, negative, scaled by the absolute value of the previously defined measure of distance $|D_{cat_a}|$ (used in the equation below as a preliminary measure of distance):

$$D_{cat_b}(p,q) = -1^{sgn|m-n|} |D_{cat_a}|$$

where it may be seen that the sign term $-1^{sgn|m-n|}$ is one when the value of the element of the test vector corresponding to the maximum element of the reference vector is the maximum element of the test vector, and negative one otherwise. This metric provides a different view of agreement such that forecasts on the positive side of the partition agree about which bin should be assigned maximum value and forecasts on the negative side pick some other bin for the maximum.

In some embodiments, in addition to allowing users to interactively evaluate each other's responses and citations through direct commentary, the system also automatically evaluates (at 140, FIG. 1) the content and quality of each user's rationales through a series of language analytics algorithms. This method may be used to assign a score to each rationale based on the estimated accuracy of the forecast associated with the rationale, providing an alternative or parallel method of judgment to the voting provided by the users. The language analytics may process the rationales and provide a set of features that are used to estimate the accuracy of the forecast. The features that are extracted, in some embodiments, are described in the '397 Application. For example, various sentence structures, word usage, citation patterns, and the user's past forecasting history may be correlated to train a supervised machine learning algorithm (e.g., a support vector machine, a Bayesian network, or deep learning) to compute the score, which is the likelihood that the forecast will be proven correct. This may help to remove bias from voting and fill in quality information in instances where there are few user votes.

Such an automated evaluation may be accomplished using a probabilistic graphical model called Probabilistic Matrix Factorization for Rationalized Forecasts (PMF-RF) that learns the relationship between latent user profiles and the arguments made in each forecast rationale. Such an approach is described in the '397 Application. Some embodiments of the present system for argumentation may be set up to implement the PMF-RF model, enabling it to identify quality rationales with a high likelihood of accuracy. In some embodiments, a model is built, of (1) each user's forecasting abilities (i.e., how often the user is eventually proven correct), (2) the difficulty of the specific problem, and (3) the discussion that occurs in response to the rationale that the user provides. By understanding the relationship between these three variables, the model predicts how accurate the user will be on each problem. In small data settings, this model learns much more about users through their rationale than just by watching their forecasting accuracy. For example, if the model is able to extract features from the rationale, less historical data may be needed in order to make predictions about a given user's forecast. This improved understanding of users' abilities may then be used to provide more accurate estimates of which users are likely to make strong arguments on either side of the debate.

In some embodiments, automated aggregation and mediation are performed (at 145, FIG. 1) to generate a mediated solution, e.g., when the users of the system that are collaborating on a problem cannot arrive at a consensus. This circumstance may be determined to exist, for example, if the variance in the responses at a given time (i.e., the "drop-dead" time at which a decision needs to be made) exceeds a threshold. If the variance in the responses exceeds a threshold, then the system may determine that there is no agreement and the system may make a decision on behalf of the group using the information it has already. Another example may be the convergence of opinions over time; as consensus grows, the variance may decrease toward zero (where zero variance would indicate 100% agreement across all system participants). If the decrease of the variance towards zero stalls for a long period of time as designated by the person asking the question, then the system may declare a deadlock and make the decision based on the information it has already. If the users of the system that are collaborating on a problem cannot arrive at a consensus, the system may attempt to use the feedback that users provide on each other's rationales and citations and its own rationale evaluation algorithms to generate a consensus opinion for the discussion question without further input from the users. This may be done through a scoring mechanism that looks at the set of rationales for all sides of a debate and assigns a value to each option based on the weighted votes from users on each rationale, the comments on the rationales, and the relevance and veracity scores for the citations on the rationales. This allows the system to assign a single value score to each of the potential options for the question, which can then be normalized to a probability assignment.

For example, a multitask modeling framework for task assignment that learns the skills of participants in a crowd and then assigns them to a task based on its requirements and the skills of the available participants may be used. Such a framework is described, for example, in M. Rostami et al., "A Crowdsourcing Triage Algorithm for Geopolitical Event Forecasting", RecSys '18, Oct. 2-7, 2018, Vancouver, BC, Canada, which is incorporated herein by reference. In such an approach, instead of using information about the skills of participants for assignment, the system can leverage the skill and feature information provided by the framework to assign weights to the individual system inputs (i.e., assertions, rationale scores, and citation scores) to generate a final aggregated system response. During the learning and parameter inference phases of this approach, the system estimates the parameters of the system inputs based on historical performance (e.g., how correct the rationale provider or voter or commenter was on this topic area in the past, the past value of a given reference source, etc.). This act may also incorporate the veracity and relevance scores for citations, where well-referenced arguments are provided a higher weight than an argument that is poorly referenced or one with no references at all. Then, having learned all of the model parameters, the system may incorporate the features of the system inputs into the aggregation process by considering the value for the probabilities as described in the framework in equation 1 of the Rostami publication identified above. As a result, a consensus opinion is created that is the weighted aggregate of the individual participant opinions as weighted by their citation and general feedback scores. For example, in some embodiments, all of the forecasts are averaged and the average is used as the system response. In other embodiments, a weighted average may be computed, as described in the '397 Application.

When the system performs mediation on its inputs to arrive at a decision, it may generate an audit trail for human evaluation to ensure that (1) the system has not made any errors in its processing and (2) that all participants may see and understand the decision that was made by the system though complete system transparency. The audit trail that the system produces may include the following for each question that the system mediates: each rationale ID, each rationale score, a list of citations and relevance and veracity scores for each, discussion thread structure (i.e., level of each rationale or argument in the thread), and weight of each input in the decision. A graphical user interface may be implemented to display this information to the users or it may be outputted as a text file.

As used herein, a first forecast (of another user) is "more distant" from the forecast of the present user than a second forecast (of another user) if the absolute value of the distance of the first forecast from the forecast of the present user exceeds the absolute value of the distance of the second forecast from the forecast of the present user. As used herein, a "forecast" is any quantifiable information that is not known to the operator, either because it is information related to one or more events that have not yet taken place, or for other reasons. As such, hypotheses about the root cause of a failure that has already occurred may be referred to as "forecasts" even though they are not predictions about a future event. As used herein "a ratio of" a first quantity and a second quantity means the first quantity divided by the second quantity. For example, "a ratio of A and B" means A/B. As used herein, the word "or" is inclusive, so that, for example, "A or B" means any one of (i) A, (ii) B, and (iii) A and B.

Some or all of the operations described herein may be performed by one or more processing circuits. For example, the system for argumentation may be hosted on a server including a processing circuit, and each user and the host may use a user interface (e.g., in a web browser) displayed by a computer including a processing circuit. The server may perform aggregation of user responses, as well as automated argument evaluation, and automated aggregation and mediation, as discussed above. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Figure 6:
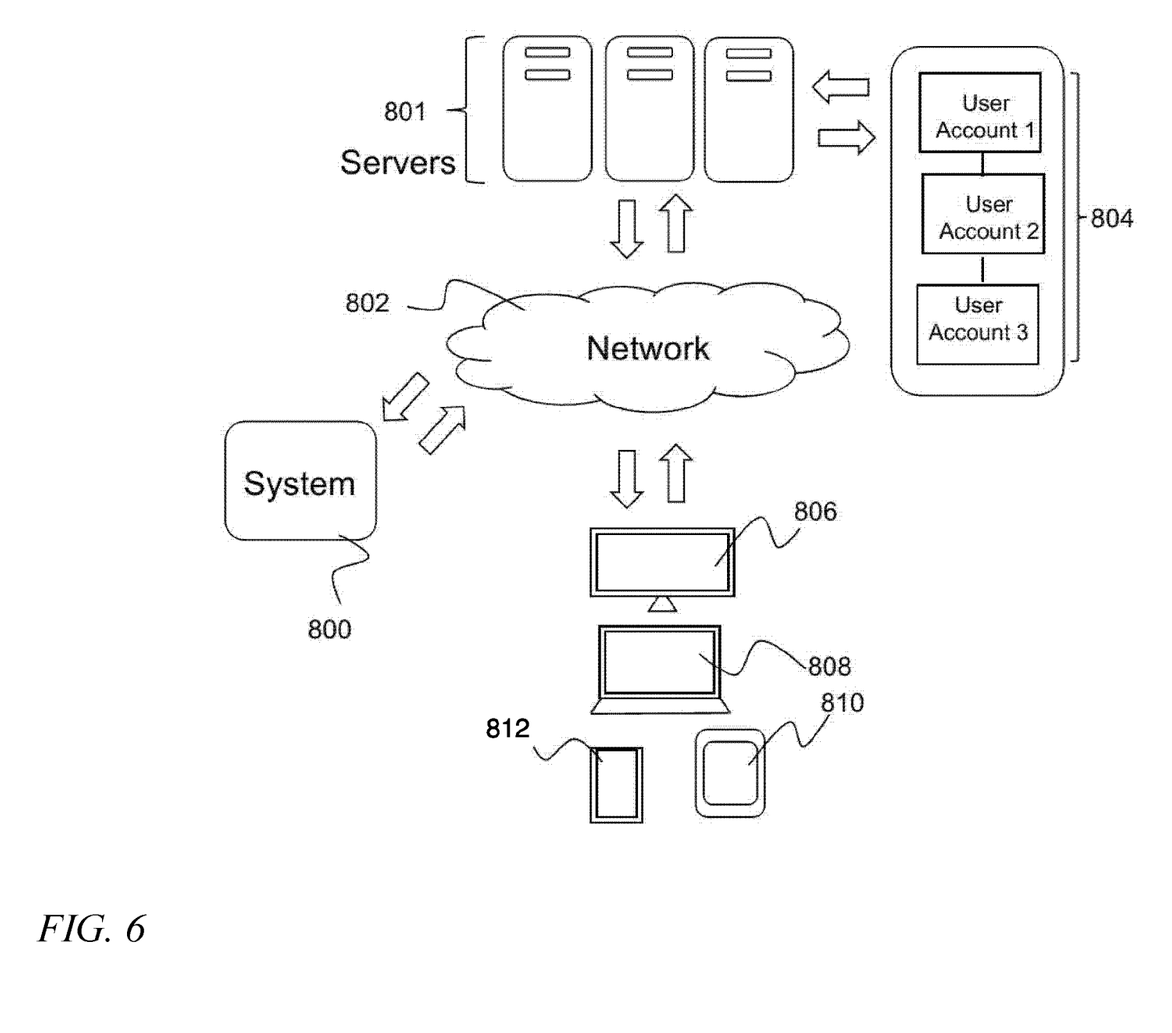
FIG. 6 is a block diagram illustrating various computerized systems communicating with one another which may be used to implement embodiments of the present invention.

FIG. 6 is a block diagram illustrating various computerized systems communicating with one another which may be used to implement embodiments of the present invention.

As shown in FIG. 6, a system 800 according to some embodiments of the present disclosure connects with servers 801 (e.g., device to be operated) to perform the operations described herein, such as generating a report or sending a message based on the predicted state change. In such an example, the servers 801 could include social media servers or other electronic communications devices configured to send alerts to users regarding events.

For example, the system 800 may include a processing circuit configured to run an application providing the functionality of some embodiments. Such an application may serve, to each of a plurality of users (e.g., to a respective web browser operated by each user) pages implementing user interfaces (such as those of FIGS. 2-5B) allowing each user to provide input, and to view and rate the input of other users. The application may further perform aggregation and arbitration of user responses (as discussed above), and it may take action (e.g., take corrective action) in response to conclusions reached (e.g., as a result of user consensus, or as a result of arbitration), as discussed in further detail below. In some embodiments the application may be distributed, e.g., a portion of the application that serves the user interfaces and receives the user input may run on a server that is different from a server that aggregates the user input and that may perform arbitration. The system 800 connects via a network 802 to servers 801 to send and receive information relating to various social media network of interconnected user accounts (element 804) that are accessed via mobile and non-mobile devices, non-limiting examples of which include desktop computers 806, laptop computers 808, smartphones 810, and other mobile devices 812. Non-limiting examples of user accounts (element 804) include Facebook® user accounts and Twitter® user accounts. As can be appreciated by one skilled in the art, the user device is any device that can receive and transmit data via the network 802. Additionally, a user account may be a user account of a social media platform, which may or may not be capable of receiving targeted marketing.

Embodiments of the present invention may also be used as inputs to a control system. For example, the control system may be a component of a system which may also operate as a system for diagnosing the root cause of a failure (e.g., in an industrial system, a nuclear reactor, a flood control system, an automobile, or the like). In response to identifying a root cause (e.g., reaching a consensus on a root cause), the system may take a remedial action to remediate the failure (e.g. automated action, to open or close flood gates, in the case of a flood control system).

In other aspects, the servers 801 can be social network platforms or advertisement delivery networks to access information or automatically provide targeted information and/or advertisements to a display screen on a communication device (elements, 806, 808, 810, 810) via a social network account (element 804).

Computers and Other Processing Circuits

Various portions of embodiments of the present invention that refer to the use of a "processing circuit" may be implemented with logic gates, or with any other embodiment of a processing unit or processing circuit. The term "processing unit" or "processing circuit" is used herein to include any combination of hardware, firmware, and software, employed to process data or digital signals.

Figure 7:
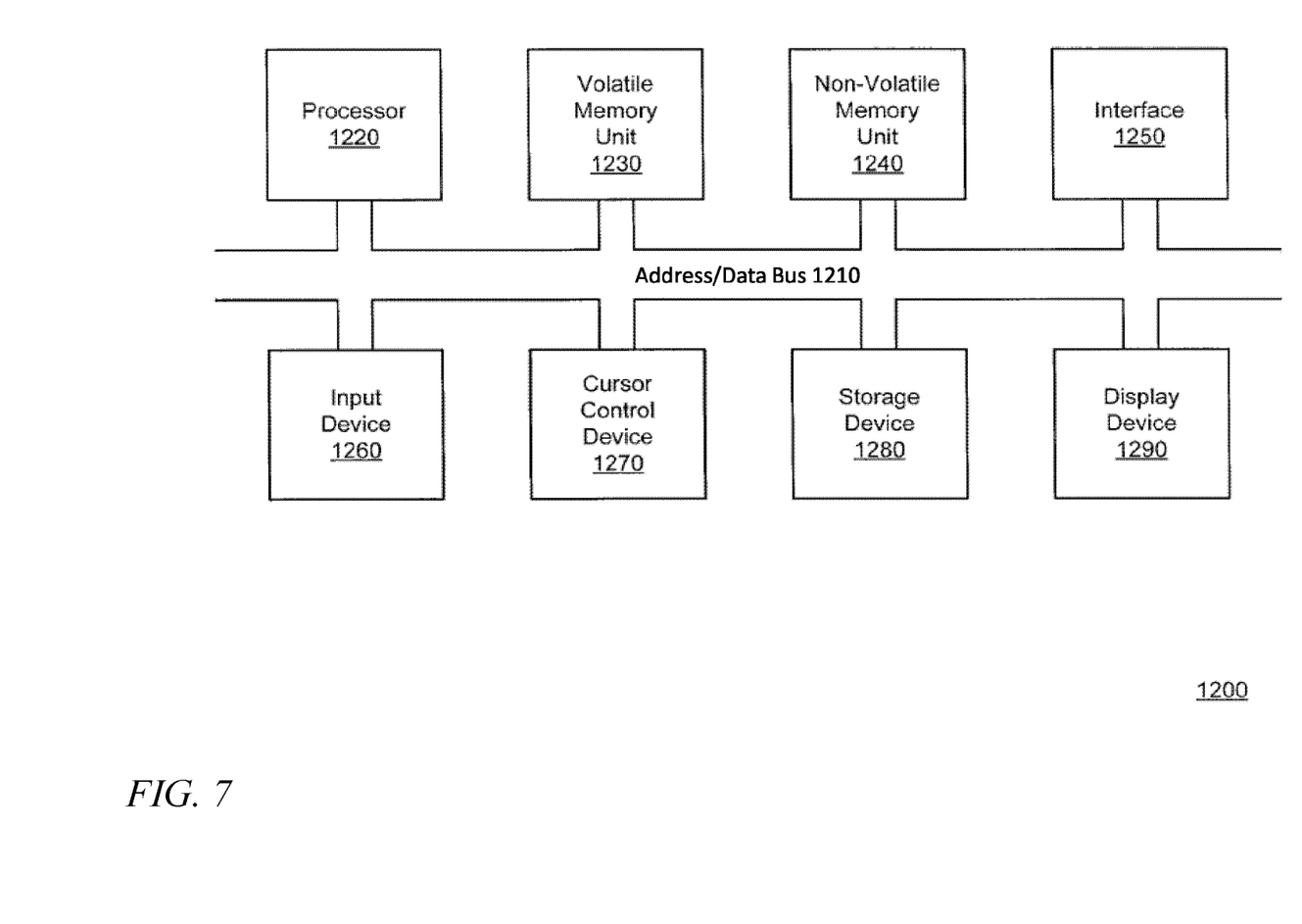
FIG. 7 is a block diagram illustrating a processing system, a processing circuit, or a portion of a processing system or processing circuit used in conjunction with at least one embodiment of the present invention.

FIG. 7 is a block diagram illustrating a processing system, a processing circuit, or a portion of a processing system or processing circuit, referred to herein as a computer system, used in conjunction with at least one embodiment of the present invention.

An exemplary computer system 1200 in accordance with an embodiment is shown in FIG. 7. Exemplary computer system 1200 is configured to perform calculations, processes, operations, and/or functions associated with a program or algorithm. In one embodiment, certain processes and steps discussed herein are realized as a series of instructions (e.g., a software program) that reside within computer readable memory units and are executed by one or more processing circuits of exemplary computer system 1200. When executed, the instructions cause exemplary computer system 1200 to perform specific actions and exhibit specific behavior, such as described herein.

Exemplary computer system 1200 may include an address/data bus 1210 that is configured to communicate information. Additionally, one or more data processing units, such as processing circuit 1220, are coupled with address/data bus 1210. Processing circuit 1220 is configured to process information and instructions. In an embodiment, processing circuit 1220 is a microprocessor. Alternatively, processing circuit 1220 may be a different type of processor such as a parallel processor, or a field programmable gate array.

Exemplary computer system 1200 is configured to utilize one or more data storage units. Exemplary computer system 1200 may include a volatile memory unit 1230 (e.g., random access memory ("RAM"), static RAM, dynamic RAM, etc.) coupled with address/data bus 1210, wherein volatile memory unit 1230 is configured to store information and instructions for processing circuit 1220. Exemplary computer system 1200 further may include a non-volatile memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile memory unit 1240 is configured to store static information and instructions for processing circuit 1220. Alternatively exemplary computer system 1200 may execute instructions retrieved from an online data storage unit such as in "Cloud" computing. In an embodiment, exemplary computer system 1200 also may include one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplary computer system 1200 may include an input device 1260 coupled with address/data bus 1210, wherein input device 1260 is configured to communicate information and command selections to processing circuit 1220. In accordance with one embodiment, input device 1260 is an alphanumeric input device, such as a keyboard, that may include alphanumeric and/or function keys. Alternatively, input device 1260 may be an input device other than an alphanumeric input device. In an embodiment, exemplary computer system 1200 may include a cursor control device 1270 coupled with address/data bus 1210, wherein cursor control device 1270 is configured to communicate user input information and/or command selections to processing circuit 1220. In an embodiment, cursor control device 1270 is implemented using a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further may include one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), or digital versatile disk ("DVD")). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented using computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

The terminology used herein is for the purpose of describing particular embodiments only and is not intended to be limiting of the inventive concept.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system of structured argumentation for asynchronous collaboration and machine-based arbitration have been specifically described and illustrated herein, many modifications and variations will be apparent to those skilled in the art. Accordingly, it is to be understood that a system of structured argumentation for asynchronous collaboration and machine-based arbitration constructed according to principles of this disclosure may be embodied other than as specifically described herein. The invention is also defined in the following claims, and equivalents thereof.

What is claimed is:

1. A method for collecting and processing user input, the method comprising:
    presenting, by a processing circuit, a first user with a prompt for eliciting a first response, the first response comprising:
        a numerical portion comprising one or more numbers, and
        an explanatory portion;
    receiving, by the processing circuit, from the first user, the first response;
    receiving, by the processing circuit, from a second user, a fourth response;
    receiving, by the processing circuit, from each of a plurality of other users, a respective response of a plurality of other responses;
    displaying, by the processing circuit, to the first user, a first ordered list of other responses;
    displaying, by the processing circuit, to the second user, a second ordered list of other responses;
    determining, by the processing circuit, whether the first user, the second user, and the other users have reached a consensus;
    in response to determining that the first user, the second user, and the other users have formed a consensus forecast, producing, by the processing circuit, the consensus forecast;
    in response to determining that the first user, the second user, and the other users have not formed a consensus forecast, producing, by the processing circuit, a mediated forecast; and
    causing, by the processing circuit, a control system to take an automated action, in response to the consensus forecast or in response to the mediated forecast,
    wherein:
        a second response, of the plurality of other responses, is earlier in the first ordered list than a third response, of the plurality of other responses,
        the second response is, according to a measure of distance, more distant than the third response from the first response,
        the third response is earlier in the second ordered list than the second response, and
        the third response is, according to a measure of distance, more distant than the second response from the fourth response.

2. The method of claim 1, further comprising denying the first user access to all of the other responses until the first response is received from the first user.

3. The method of claim 1, wherein the prompt for eliciting the first response comprises a prompt for eliciting the numerical portion and prompt for eliciting the explanatory portion,
    the prompt for eliciting the numerical portion comprising a prompt for eliciting a forecast; and
    the prompt for eliciting the explanatory portion comprising a prompt for eliciting a rationale for the forecast.

4. The method of claim 3, wherein the prompt for eliciting the explanatory portion further comprises a prompt for eliciting citations supporting the rationale.

5. The method of claim 1, further comprising presenting the first user with a prompt for eliciting a rating of the second response.

6. The method of claim 1, further comprising:
displaying the first response to the second user, and
eliciting, from the second user, a rating of the first response.

7. The method of claim 6, further comprising presenting, to the second user, a prompt for eliciting a rating of a citation in the first response.

8. The method of claim 7, wherein the prompt for eliciting the rating of the citation in the first response comprises:
a prompt for eliciting an assessment of relevance of the citation; and
a prompt for eliciting an assessment of veracity of the citation.

9. The method of claim 1, further comprising, after displaying, to the first user, the first ordered list of other responses,
presenting the first user with a prompt for eliciting an adjustment to the first response.

10. The method of claim 1, wherein:
the numerical portion represents an ordinal forecast, and is represented by a vector of numbers; and
the measure of distance is, for a first vector and a second vector, a ratio of:
a difference between:
an answer density of the first vector and
an answer density of the second vector; and
a measure of similarity between the first vector and the second vector.

11. The method of claim 10, wherein the answer density of each of the first vector and the second vector is a weighted sum over elements of the vector, with each weight being an index of the respective element.

12. The method of claim 11, wherein the measure of similarity is a ratio of:
a dot product of the vectors, and
a product of magnitudes of the vectors.

13. The method of claim 1, wherein:
the numerical portion represents a categorical forecast, and is represented by a vector of numbers,
the measure of distance, from a reference vector, of a test vector, is a ratio of:
a difference between:
a value of a maximum element of the reference vector and
a value of an element of the test vector corresponding to the maximum element of the reference vector; and
a measure of similarity between the vectors.

14. The method of claim 13, wherein the measure of similarity is a ratio of:
a dot product of the vectors, and
a product of magnitudes of the vectors.

15. The method of claim 1, wherein:
the numerical portion represents a categorical forecast, and is represented by a vector of numbers,
the measure of distance, from a reference vector, of a test vector, is a product of:
a sign term, and
a preliminary measure of distance, from the reference vector, of the test vector.

16. The method of claim 15, wherein the preliminary measure of distance, from the reference vector, of the test vector, is an absolute value of a ratio of:
a difference between:
a value of a maximum element of the reference vector and
a value of an element of the test vector corresponding to the maximum element of the reference vector; and
a ratio of:
a dot product of the vectors, and
a product of magnitudes of the vectors.

17. The method of claim 16, wherein the sign term is:
one, when the value of the element of the test vector corresponding to the maximum element of the reference vector is a maximum element of the test vector, and
negative one, otherwise.

18. The method of claim 1, further comprising assigning, by a processing circuit, a rating to the first response and to each of the other responses.

19. The method of claim 1, further comprising displaying to the first user a position of the numerical portion within a range of numerical portions of other responses.

20. The method of claim 1, wherein the automated action taken, in response to the consensus forecast or in response to the mediated forecast, is opening or closing of flood gates.

21. The method of claim 1, further comprising displaying, by the processing circuit, to the first user, a summary graph indicating a distance between the first response and a response from among the other responses.

22. A system for collecting and processing user input, the system comprising:
a processing circuit, and
a memory coupled to the processing circuit and having instructions stored thereon that, when executed by the processing circuit, cause the processing circuit to:
present a first user with a prompt for eliciting a first response, the first response comprising:
a numerical portion comprising one or more numbers, and
an explanatory portion;
receive, from the first user, the first response;
receive, from a second user, a fourth response;
receive, from each of a plurality of other users, a respective response of a plurality of other responses;
display, to the first user, a first ordered list of other responses;
display, to a second user, a second ordered list of other responses;
determine whether the first user and the other users have reached a consensus;
in response to determining that the first user, the second user, and the other users have formed a consensus forecast, produce the consensus forecast;
in response to determining that the first user, the second user, and the other users have not formed a consensus forecast, produce a mediated forecast; and
cause a control system to take an automated action, in response to the consensus forecast or in response to the mediated forecast,
wherein:
a second response, of the plurality of other responses, is earlier in the first ordered list than a third response, of the plurality of other responses,
the second response is, according to a measure of distance, more distant than the third response from the first response,
the third response is earlier in the second ordered list than the second response, and
the third response is, according to a measure of distance, more distant than the second response from the fourth response.

* * * * *